United States Patent
Tseng et al.

(10) Patent No.: US 11,065,795 B1
(45) Date of Patent: Jul. 20, 2021

(54) MOLDING SYSTEM FOR PREPARING THERMOPLASTIC COMPOSITE ARTICLE

(71) Applicant: CORETECH SYSTEM CO., LTD., Chupei (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei (TW)

( * ) Notice: Subject to any disclaimer, the term of this patent is extended or adjusted under 35 U.S.C. 154(b) by 0 days.

(21) Appl. No.: 16/878,127

(22) Filed: May 19, 2020

Related U.S. Application Data (60) Provisional application No. 62/987,582, filed on Mar. 10, 2020.

(51) Int. Cl.
*B29C 45/77* (2006.01)
*B29C 45/00* (2006.01)
*B29C 45/76* (2006.01)

(52) U.S. Cl.
CPC ...... *B29C 45/7646* (2013.01); *B29C 45/0005* (2013.01); *B29C 45/77* (2013.01); *B29C 2045/0098* (2013.01)

(58) Field of Classification Search
CPC . B29C 45/00; B29C 45/0005; B29C 45/0025; B29C 2045/0008;
(Continued)

(56) References Cited

U.S. PATENT DOCUMENTS 5,770,131 A * 6/1998 Bubel ................. B29C 45/0082
264/69
9,283,695 B1 * 3/2016 Tseng .................. B29C 33/3835
(Continued)

OTHER PUBLICATIONS

Costa, F.S., H. Yokoi, Y. Murata, and P.K. Kennedy, "Numerical Simulation of Ear-Flow: The Faster Advance of the Flow Front at the Edge of a Cavity," Polymer Processing Society (PPS) 22nd, Yamagata, Japan (2006), 2 pages.
(Continued)

*Primary Examiner* — Joseph S Del Sole
*Assistant Examiner* — Thu Khanh T Nguyen
(74) *Attorney, Agent, or Firm* — Muncy, Geissler, Olds & Lowe, P.C.

(57) ABSTRACT

The present disclosure provides a molding system for preparing an injection-molded plastic article. The molding system includes a molding machine; a mold disposed on the molding machine and having a mold cavity for being filled with a molding resin including a plurality of polymer chains; a processing module configured to generate an anisotropic viscosity distribution of the molding resin in the mold cavity based on a molding condition for the molding machine; wherein the anisotropic viscosity distribution of the molding resin is generated based in part on consideration of an integral effect of a volume fraction and an aspect ratio of the plurality of fibers; and a controller coupled to the processing module and configured to control the molding machine with the molding condition using the generated anisotropic viscosity distribution of the molding resin to perform an actual molding process for preparing the injection-molded plastic article.

11 Claims, 7 Drawing Sheets

(58) Field of Classification Search
CPC ...... B29C 2045/002; B29C 2045/0098; B29C 2945/76652; B29C 45/77; B29C 2945/7604; B29C 2945/76056; B29C 2945/76381; B29C 2945/76665

See application file for complete search history.

(56) References Cited

U.S. PATENT DOCUMENTS

| | | |
|---|---|---|
| 10,201,918 B1 | 2/2019 | Favaloro et al. |
| 10,201,921 B1 | 2/2019 | Tseng et al. |

OTHER PUBLICATIONS

Bakharev, A., D. Astbury, S. Ray, F.S. Costa, and R. Speight, "Effect of Normal Stresses on the Results of Thermoplastic Mold Filling Simulation," International Conference on Numerical Methods in Industrial Forming, 80, 16004 (2016), 5 pages.

Favaloro, A. J., H.-C. Tseng, and R. B. Pipes, "A New Anisotropic Viscous Constitutive Model for Composites Molding Simulation," Composites Part A: Applied Science and Manufacturing 115 112-122 (2018), 11 pages.

Tseng, H.-C. and A. J. Favaloro, "The Use of Informed Isotropic Constitutive Equation to Simulate Anisotropic Rheological Behaviors in Fiber Suspensions," J Rheol 63 263-274 (2019), 12 pages.

Cross, M. M., "Relation between Viscoelasticity and Shear-Thinning Behaviour in Liquids." Rheol Acta 18 609-614 (1979), 6 pages.

Pipes, R. B., D. W. Coffin, P. Simacek, S. R. Shuler, and R. K. Okine, Rheological Behavior of Collimated Fiber Thermoplastic Composite Materials,Elsevier, Amsterdam,pp. 85-125, 1994, 42 pages.

Mobuchon, C., P. J. Carreau, M.-C. Heuzey, M. Sepehr, and G. Ausias, "Shear and Extensional Properties of Short Glass Fiber Reinforced Polypropylene.". Polym Compos 26 247-264 (2005), 19 pages.

Petrie, C. J. S., "Extensional Viscosity: A Critical Discussion." J Non-Newtonian Fluid. Mech 137 15-23 (2006), 9 pages.

Rong-Yeu Chang and Wen-Hsien Yang, "Numerical simulation of mold filling in injection molding using a three-dimensional finite volume approach," International Journal for Numerical Methods in Fluids vol. 37, Issue 2, pp. 125-148, Sep. 30, 2001, 24 pages.

\* cited by examiner

MOLDING SYSTEM FOR PREPARING THERMOPLASTIC COMPOSITE ARTICLE

CROSS-REFERENCE TO RELATED APPLICATION

This patent application claims priority under 35 U.S.C. § 119(e) from Provisional Patent Application No. 62/987,582, filed on Mar. 10, 2020, the disclosure of which is incorporated by reference herein in its entirety, including all exhibits appended to Provisional Patent Application No. 62/987,582.

TECHNICAL FIELD

The present disclosure relates to a molding system for preparing an injection-molded plastic article, and more particularly, to an injection-molding system for preparing an injection-molded plastic article using a computer-aided engineering (CAE) simulation.

DISCUSSION OF THE BACKGROUND

Figure 1:
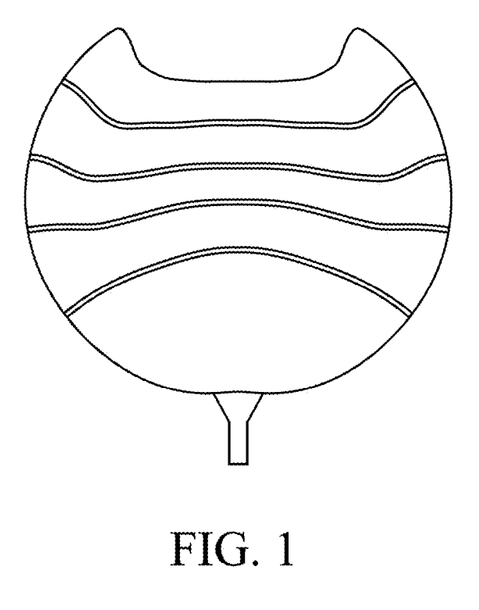
FIG. 1 shows the well-known experimental observation of ear flow for polycarbonate (PC) melt in an injection-molded disk with pin gate.
Figure 2:
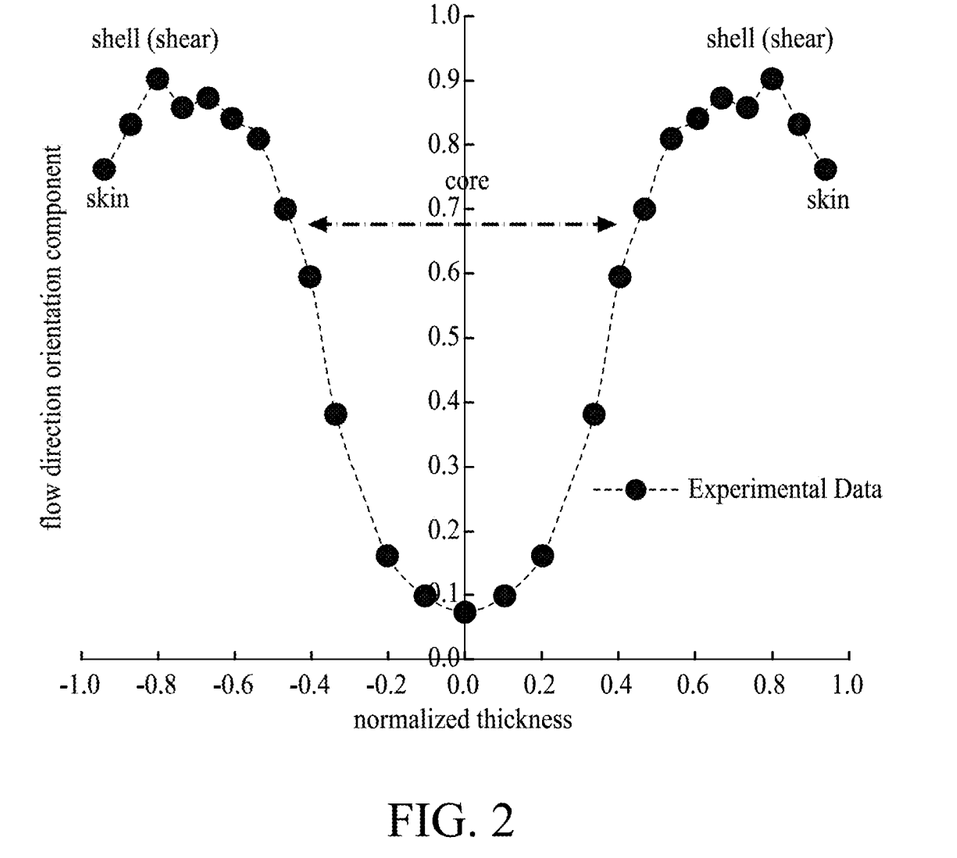
FIG. 2 shows experimental data indicating the flow direction orientation component in relation to normalized thickness across three areas, including skin, shell (or shear) and core structures.
Figure 3:
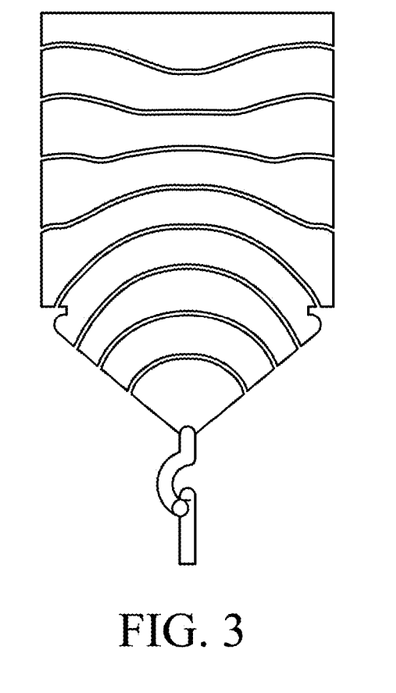
FIG. 3 shows an ear flow simulation for fiber-filled polymer materials.

There is a long-running problem requiring an urgent solution for the industry: to date, prior state-of-the-art predictive engineering tools (See, for example, Costa, F. S., H. Yokoi, Y. Murata, and P. K. Kennedy, "Numerical Simulation of Ear-Flow: The Faster Advance of the Flow Front at the Edge of a Cavity," *Polymer Processing Society (PPS)* 22th, Yamagata, Japan (2006) and Bakharev, A., D. Astbury, S. Ray, F. S. Costa, and R. Speight, "Effect of Normal Stresses on the Results of Thermoplastic Mold Filling Simulation," *International Conference on Numerical Methods in Industrial Forming*, 80, 16004 (2016); the entirety of the above-mentioned publications is hereby incorporated by reference herein and made a part of this specification) have always provided unsatisfactory results, particularly regarding the so-called "ear flow" in which the advance of the flow front in the center of the cavity is obviously slower than at the edges. FIG. 1 shows the well-known experimental observation of ear flow for the pure polycarbonate (PC) melt in an injection-molded disk with pin gate. The IISO (informed isotropic) viscosity model can simulate an ear flow for fiber composites with skin-shear-core structure of fiber orientation, as shown in FIG. 2 and FIG. 3. Because the injection-molded PC discs exhibit the same structure of molecular orientation, the present invention proposes that the IISO viscosity model for fiber-reinforced composites with fiber orientation should be extended to simulate the ear flow induced by molecular orientation for neat polymers.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing an injection-molded plastic article, comprising: a molding machine; a mold disposed on the molding machine and having a mold cavity for being filled with a molding resin including a plurality of polymer chains; a processing module configured to generate an anisotropic viscosity distribution of the molding resin in the mold cavity based on a molding condition for the molding machine; wherein the anisotropic viscosity distribution of the molding resin is generated based in part on consideration of an integral effect of a volume fraction and an aspect ratio of the plurality of fibers; and a controller coupled to the processing module and configured to control the molding machine with the molding condition using the generated anisotropic viscosity distribution of the molding resin to perform an actual molding process for preparing the injection-molded plastic article.

In some embodiments, the integral effect of a volume fraction and an aspect ratio of the fibers is represented by an expression:

$$N_P = \frac{\eta_E}{\eta_S} = \phi \left(\frac{L_f}{D_f}\right)^2 \frac{N_{P0}}{1+\left(\frac{\dot{\gamma}}{\dot{\gamma}_c}\right)^2}$$

Where $N_p$ is the ratio of elongation viscosity $\eta_E$ to shear viscosity $\eta_S$; $\phi$ is the volume fraction of the fibers, and $L_f$ and $D_f$ are fiber length and fiber diameter, respectively; $N_{P0}$ and $\dot{\gamma}_c$ are parameters In some embodiments, the processing module is further configured to generate a mixed anisotropic viscosity distribution of the molding resin in the mold cavity based on a molding condition for the molding machine, wherein the mixed anisotropic viscosity distribution of the molding resin is generated by taking into consideration an extension rate distribution and a shear rate distribution of the molding resin.

In some embodiments, the mixed anisotropic viscosity distribution of the molding resin is represented using an expression:

$$\eta_M = \eta_S \left[1 + (R_{TR}) \frac{(\dot{\gamma}_E^*)^2}{(\dot{\gamma})^2}\right]$$

$$R_{TR}(\dot{\gamma}) = \frac{\eta_E}{\eta_S} = N_1 + \frac{N_2}{[1+(\lambda \dot{\gamma})^{n_1}]^{n_2}}$$

$$\dot{\gamma}^2 = (\dot{\gamma}_S^*)^2 + (\dot{\gamma}_E^*)^2$$

where $\eta_M$ represents the mixed anisotropic viscosity distribution, $\eta_S$ represents a shear viscosity distribution, $\eta_E$ represents an extension viscosity distribution, $N_1$, $N_2$, $n_1$, $n_2$, and $\lambda$ are constants, $\dot{\gamma}$ represents a total strain rate distribution of the molding resin, $\dot{\gamma}_S^*$ represents the shear rate distribution of the molding resin, and $\dot{\gamma}_E^*$ represents the extension rate distribution of the molding resin.

In some embodiments, the processing module is configured to generate the extension rate distribution and the shear rate distribution of the molding resin based in part on consideration of a velocity distribution of the molding resin in the mold cavity.

In some embodiments, the processing module is configured to generate the extension rate distribution and the shear rate distribution of the molding resin in a principal flow streamline coordinate system, and generate the velocity distribution of the molding resin in the mold cavity in a Cartesian coordinate system.

In some embodiments, the processing module is configured to generate a rate-of-deformation distribution of the molding resin in the Cartesian coordinate system based in part on consideration of the velocity distribution due to a geometry variation of the mold cavity.

In some embodiments, the processing module is configured to transform the rate-of-deformation distribution of the molding resin in the Cartesian coordinate system into a rate-of-deformation distribution of the molding resin in the principal flow streamline coordinate system.

In some embodiments, the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module is configured to generate the rate-of-deformation distribution of the molding resin in the principal flow streamline coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where R and $R^T$ represent coordinate transfer matrixes represented by an expression:

$$R = \begin{bmatrix} t \\ n \\ b \end{bmatrix}$$

$$RR^T = R^T R = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

In some embodiments, the unit tangent vector t, the unit normal vector n, and the unit bi-normal vector b are represented by an expression:

$$t = \frac{v}{|v|}$$

$$n = \frac{dv/ds}{|dv/ds|}$$

$$b = t \times n$$

where v is a flow velocity vector indicating the tangent direction of the flow line, and dv/ds is a direction of velocity changes along the arc of the flow line.

In some embodiments, the processing module is configured to divide the rate-of-deformation distribution of the molding resin in the principal flow streamline coordinate system into the extension rate distribution and the shear rate distribution of the molding resin represented by an expression:

$$D^* = S^* + E^*$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2 S^* : S^*}$$

$$\dot{\gamma}_E^* = \sqrt{2 E^* : E^*}$$

$$\dot{\gamma}^2 = (\dot{\gamma}_S^*)^2 + (\dot{\gamma}_E^*)^2$$

where $\dot{\gamma}$ represents a total strain rate distribution of the molding resin, $\dot{\gamma}_S^*$ represents the shear rate distribution, and $\dot{\gamma}_E^*$ represents the extension rate distribution.

In some embodiments, the processing module is configured to generate the extension rate distribution and the shear rate distribution of the molding resin based in part on consideration of a rate-of-deformation distribution of the molding resin due to the geometry variation of the mold cavity.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an injection-molded article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

To control the quality of the molded products, a deep understanding of complicated flow fields is critical. Computer-aided engineering (CAE) software provides realistic simulation and predictive analysis for complex flows of complex fluids. Viscosity is the key factor affecting flow of polymer fluids. In the academic research of fluid mechanics and rheology, the viscosity that physically indicates the resistance of flow contains two types: shear viscosity and extension viscosity. The viscosity plays an essential role in the physics of fluids. As a rule, both have been investigated separately. Usually, the magnitude of extension viscosity is more than three times the magnitude of shear viscosity.

In practice, a finished product consists of many complex geometric features, such as various changes in the direction of the flow, the inclusion of ribs, and changes in thickness and holes. A complex geometric channel flow is a combination of shear flow and extension flow. Thus, it is very important that the viscosity should include both shear and extension components. However, such a mixed viscosity of viscous shear and elastic extension has not been investigated in the academic rheological research. Current state-of-the-art CAE tools do not provide satisfactory simulations of VE flow behaviors for polymer fluids, since the shear viscosity does not take into account the elastic extension effect.

More recently, for fiber-filled polymer materials, Favaloro, et al. and Tseng et al. have developed the so-called informed isotropic (IISO) viscosity model (See, Favaloro, A. J., H.-C. Tseng, and R. B. Pipes, "A New Anisotropic Viscous Constitutive Model for Composites Molding Simulation," Composites Part A: Applied Science and Manufacturing 115 112-122 (2018); Tseng, H.-C. and A. J. Favaloro, "The Use of Informed Isotropic Constitutive Equation to Simulate Anisotropic Rheological Behaviors in Fiber Suspensions," J Rheol 63 263-274 (2019); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. patent Ser. No. 10/201,921 (2019).). The IISO viscosity is a combinative viscosity in which the polymer matrix contributes shear viscosity and the fiber fillers induce the extension viscosity. The present invention is inspired by the IISO concept to propose the mixed shear-extension viscosity for unfilled polymers. Therefore, one objective of the present disclosure is to implement the increase of the corner vortex size with flow rate for the well-known contraction flow for VE fluids. In addition, one can simulate the significant flow phenomena of injection molded polymer melts, including ear flow and jetting flow.

The actual flow of polymer melts is transient, non-Newtonian and non-isothermal, with frozen layers building up as the complex mixture flows through the mold cavity. The governing equations of fluid mechanics include the equation of continuity, the equation of motion, and the equation of energy to describe the transient and non-isothermal flow motion as follows:

$$\frac{\partial \rho}{\partial t} + \nabla \cdot \rho u = 0 \tag{1}$$

$$\frac{\partial}{\partial t}(\rho v) + \nabla \cdot (\rho v v) = -\nabla P + \nabla \cdot \tau + \rho g \tag{2}$$

$$\rho C_P \left( \frac{\partial T}{\partial t} + v \cdot \nabla T \right) = \nabla \cdot (k \nabla T) + \eta_S \dot{\gamma}^2 \tag{3}$$

where $\rho$ represents the density; u represents the velocity vector; t represents the time; $\tau$ represents the extra stress tensor; $\nabla v$ represents the velocity gradient tensor; g represents the acceleration vector of gravity; P represents the pressure; $C_P$ represents the specific heat; T represents the temperature; k represents the thermal conductivity; $\eta_S$ represents the shear viscosity; and $\dot{\gamma}$ represents the strain rate. The rate-of-deformation tensor D is the symmetric tensor of $\nabla v$:

$$D = \frac{\nabla v + \nabla v^T}{2} \tag{4}$$

The strain rate $\dot{\gamma}$ is the magnitude of the tensor D as an indicator of the rate of deformation of a material with respect to time:

$$\dot{\gamma} = \sqrt{2D:D} \tag{5}$$

For the simple shear flow, the tensor D is obtained:

$$D = \begin{bmatrix} 0 & 0 & \frac{\dot{\gamma}_S}{2} \\ 0 & 0 & 0 \\ \frac{\dot{\gamma}_S}{2} & 0 & 0 \end{bmatrix} \tag{6}$$

where the strain rate $\dot{\gamma}$ reduces to $\dot{\gamma}_S$, namely, shear rate, $\dot{\gamma} = \dot{\gamma}_S$.

Another important class of fluid flow is the extension (or elongation) flow, which refers to diagonal components of the tensor D:

$$D = \dot{\varepsilon} \begin{bmatrix} 1 & 0 & 0 \\ 0 & a & 0 \\ 0 & 0 & -(1+a) \end{bmatrix} \quad (7)$$

where $\dot{\varepsilon}$ represents the extension rate; and the parameter a can describe three extension types: a=−0.5 for uniaxial extension, a=0 for planar extension, and a=1 for biaxial extension. Due to extension deformation, the strain rate $\dot{\gamma}$ reduces to $\dot{\gamma}_E$ namely, extension rate; $\dot{\gamma}=\dot{\gamma}_E$: the uniaxial extension rate $\dot{\gamma}_{UE}=\sqrt{3}\dot{\varepsilon}$, the planar extension rate $\dot{\gamma}_{PE}=2\dot{\varepsilon}$, and the biaxial extension rate $\dot{\gamma}_{BE}=2\sqrt{3}\dot{\varepsilon}$.

The extra stress tensor τ is defined by the generalized Newtonian fluid (GNF) model for polymer fluids, $$\tau = 2\eta_S(T,P,\dot{\gamma})D \quad (8)$$

In general, the Cross-William-Landel-Ferry (Cross-WLF) flow curve model has been used to describe the shear viscosity $\eta_s$ as a function of the temperature T, pressure P, and strain rate $\dot{\gamma}$ (See, Cross, M. M., "Relation between Viscoelasticity and Shear-Thinning Behaviour in Liquids." Rheol Acta 18 609-614 (1979); Bird, R. B., R. C. Armstrong, and O. Hassager, *Dynamics of Polymeric Liquids: Fluid Mechanics* (Wiley-Interscience, New York, 1987).).

Furthermore, extensional viscosity (also known as elongational viscosity) is a viscosity coefficient when the fluid deformation is stretched. This parameter is often used for characterizing polymer solution melting. Experimentally, extensional viscosity $\eta_E$ can be measured using rheometers that apply normal stress $\sigma_N$, $$\eta_E = \frac{\sigma_N}{\dot{\varepsilon}} \quad (9)$$

where $\dot{\varepsilon}$ is the extension rate.

Usually, shear and extension viscosities are investigated separately. Usually, the magnitude of extension viscosity is more than three times the magnitude of shear viscosity. In practice, a complex geometric channel flow is a combination of shear flow and extension flow. Thus, it is very important that the viscosity should include both shear and extension components. However, such a mixed viscosity of viscous shear and elastic extension has not been investigated in the academic rheological research, which has not considered how elastic extension will affect the VE flow simulation of polymers.

For the anisotropic fiber-filled materials, Favaloro et al. and Tseng et al. recently developed the informed isotropic (IISO) viscosity scalar $\eta^{IISO}$ in the steady-state stress tensor τ (See, Favaloro, A. J., H.-C. Tseng, and R. B. Pipes, "A New Anisotropic Viscous Constitutive Model for Composites Molding Simulation," Composites Part A: Applied Science and Manufacturing 115 112-122 (2018); Tseng, H.-C. and A. J. Favaloro, "The Use of Informed Isotropic Constitutive Equation to Simulate Anisotropic Rheological Behaviors in Fiber Suspensions," J Rheol 63 263-274 (2019); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. patent Ser. No. 10/201,921 (2019).))

$$\tau = 2\eta^{IISO}D \quad (10)$$

$$\eta^{IISO} = \eta_S\left[1 + (N_P)\frac{\dot{\gamma}_f^2}{\dot{\gamma}^2}\right] \quad (11)$$

$$\frac{\dot{\gamma}_f^2}{\dot{\gamma}^2} = \frac{D:A_4:D}{2D:D} \quad (12)$$

$$N_P = \frac{\eta_E}{\eta_S} = \frac{N_{P0}}{1+\left(\frac{\dot{\gamma}}{\dot{\gamma}_c}\right)^2} \quad (13)$$

where $\eta_4=[\eta_{ijkl}]$ is the fourth-order viscosity tensor. They have demonstrated that the IISO viscosity scalar can mitigate the previous numerical convergence issue.

Physically, $\dot{\gamma}_f$ means the micro strain rate due to fiber orientation and the strain rate $\dot{\gamma}$ is due to flow fluid; the IISO viscosity parameter $N_p$ is the ratio of elongation viscosity $\eta_E$ to shear viscosity $\eta_S$. $N_{P0}$ and $\dot{\gamma}_c$ are parameters.

Referring the early study of Pipes et al. (See, Pipes, R. B., D. W. Coffin, P. Simacek, S. R. Shuler, and R. K. Okine, *Rheological Behavior of Collimated Fiber Thermoplastic Composite Materials*, Elsevier, Amsterdam, pp. 85-125, 1994.), the shear viscosity and elongation viscosity were theoretically derived as $$\eta_S = \kappa\eta_0 \quad (14)$$

$$\eta_E = \frac{\eta_0}{2}(\kappa-1)\phi\left(\frac{L_f}{D_f}\right)^2 \quad (15)$$

where $\eta_0$ is the Newtonian viscosity of a matrix; κ is fiber volume fraction parameter depending on fiber packing pattern (square or hexagonal array); φ is volume fraction of fibers; $L_f$ and $D_f$ are fiber length and fiber diameter, respectively. A fiber's aspect ratio is the ratio of its length to its diameter, $a_r=L_f/D_f$.

Therefore, the ratio of elongation viscosity to shear viscosity is obtained to be directly proportional to the volume fraction and the square of aspect ratio, $$\frac{\eta_E}{\eta_S} \propto \phi\left(\frac{L_f}{D_f}\right)^2 \quad (16)$$

For the improvement of the IISO viscosity model, the present invention proposes a new parameter $N_P$ as a function of fiber length and fiber concentration, $$N_P = \phi\left(\frac{L_f}{D_f}\right)^2 \frac{N_{P0}}{1+\left(\frac{\dot{\gamma}}{\dot{\gamma}_c}\right)^2} \quad (17)$$

It is significant that the extension viscosity 1, contributes to the IISO viscosity. According to the experimental study by Mobuchon, et al., the extension viscosity is increased more than tenfold when 30 weight percent glass fibers are added to the pure polypropylene (PP) (See, Mobuchon, C., P. J. Carreau, M.-C. Heuzey, M. Sepehr, and G. Ausias, "Shear and Extensional Properties of Short Glass Fiber Reinforced Polypropylene." Polym Compos 26 247-264

(2005)). For the isotropic fluid, $\eta_E=3\eta_S$ in the uniaxial extension flow (See, Petrie, C. J. S., "Extensional Viscosity: A Critical Discussion." J Non-Newtonian Fluid Mech 137 15-23 (2006)).

Therefore, the IISO viscosity described above is a combinative viscosity in which the polymer matrix contributes shear viscosity and the fiber fillers induce extension viscosity. The present invention is inspired by the IISO concept to propose the mixed shear-extension viscosity for unfilled polymers.

Returning to Equation (11), $\dot{\gamma}_f$ is the micro strain rate due to fiber orientation for the fiber-filled polymer fluids. The first feature of the present disclosure is replacing the fiber's stretching rate $\dot{\gamma}_f$ by the fluid's principal extension rate $\dot{\gamma}_E^*$. Thus, a mixed shear-extension viscosity $\eta_M$ for polymers is given:

$$\tau = 2\eta_M D \quad (18)$$

$$\eta_M = \eta_S \left[1 + (R_{TR}) \frac{(\dot{\gamma}_E^*)^2}{\dot{\gamma}^2}\right] \quad (19)$$

In addition, the parameter $R_{TR}$ is a function of strain rate for describing the strain hardening phenomenon of ratio of extension viscosity $\eta_E$ over shear viscosity $\eta_S$:

$$R_{TR}(\dot{\gamma}) = \frac{\eta_E}{\eta_s} = N_1 + \frac{N_2}{[1+(\lambda\dot{\gamma})^{n_1}]^{n_2}} \quad (20)$$

where the five parameters, $N_1$, $N_2$, $n_1$, $n_2$, and $\lambda$, are constants determined based on experimental data.

The velocity gradient tensor $\nabla v$ of the governing equations of fluid mechanics is given:

$$\nabla v = \begin{bmatrix} \frac{\partial v_x}{\partial x} & \frac{\partial v_x}{\partial y} & \frac{\partial v_x}{\partial z} \\ \frac{\partial v_y}{\partial x} & \frac{\partial v_y}{\partial y} & \frac{\partial v_y}{\partial z} \\ \frac{\partial v_z}{\partial x} & \frac{\partial v_z}{\partial y} & \frac{\partial v_z}{\partial z} \end{bmatrix} \quad (21)$$

In addition, the rate-of-deformation tensor D is the symmetric tensor of $\nabla v$:

$$D = \frac{\nabla v + \nabla v^T}{2} \quad (22)$$

The strain rate $\dot{\gamma}$ is the magnitude of the tensor D as an indicator of the rate of deformation of a material with respect to time:

$$\dot{\gamma} = \sqrt{2D:D} \quad (23)$$

According to the fundamental research of fluid mechanics and rheology, the strain contains basic deformations of both shear and extension. Shear rate is defined as simple shear. Considering the shear flows that have only one non-vanishing velocity component that varies along only one direction, we state the following generally accepted convention: Direction "x" or "1" is the velocity component direction, Direction "y" or "2" is the direction along which the velocity changes, and Direction "z" or "3" is the neutral direction of thickness and gradient. For the simple shear flow with the kinematics given by $v_1=3$, $v_2=0$, and $v_3=0$, the tensor D is obtained:

$$D = \begin{bmatrix} 0 & 0 & \frac{\dot{\gamma}_{13}}{2} \\ 0 & 0 & 0 \\ \frac{\dot{\gamma}_{13}}{2} & 0 & 0 \end{bmatrix} \quad (24)$$

where the strain rate $\dot{\gamma}$ reduces to $\dot{\gamma}_S$, namely, the shear rate, $\dot{\gamma}=\dot{\gamma}_S=\dot{\gamma}_{13}$, which refers to off-diagonal components of the tensor D.

For incompressible fluid, another important class of fluid flow is the extension (or elongation) flow, which refers to diagonal components of the tensor D, $$D = \dot{\varepsilon}_{11} \begin{bmatrix} 1 & 0 & 0 \\ 0 & a & 0 \\ 0 & 0 & -(1+a) \end{bmatrix} \quad (25)$$

where $\dot{\varepsilon}_{11}$ is a positive extension value along the 1-axis; the parameter a can describe three extension types: a=−0.5 for uniaxial extension, a=0 for planar extension, and a=1 for biaxial extension. Due to extension deformation, the strain rate $\dot{\gamma}$ reduces to $\dot{\gamma}_E$, namely, extension rate; $\dot{\gamma}=\dot{\gamma}_E$: the uniaxial extension rate $\dot{\gamma}_{UE}=\sqrt{3}\dot{\varepsilon}_{11}$, the planar extension rate $\dot{\gamma}_{PE}=\sqrt{2}\dot{\varepsilon}_{11}$, and the biaxial extension rate $\dot{\gamma}_{BE}=2\sqrt{3}\dot{\varepsilon}_{11}$.

According to the above descriptions, it is essential for the shear and extension deformation directions to be "preliminarily" defined in global coordinates. For the complex geometric channel flow consisting of a combination of shear flow and extension flow, the rate-of-deformation tensor D is a non-zero-value filled matrix, as below:

$$D = \begin{bmatrix} d_{11} & d_{12} & d_{13} \\ d_{12} & d_{22} & d_{23} \\ d_{13} & d_{23} & d_{33} \end{bmatrix} \quad (26)$$

Note that the tensor D varies with a variety of geometric factors, such as changes in the direction of the flow, the inclusion of ribs, and changes in thickness and holes. Flows in injection molding are dominated by shear flows. In particular, extension flows are encountered, for example, the contraction flow at gate and nozzle regions, and the fountain flow of the melt front in the cavity. However, the flow velocity direction, the direction of the velocity changes, and the neutral direction of thickness and gradient cannot be directly obtained from the tensor components. Thus, one is not able to recognize the individual contributions of shear rate and extension rate occurring in the specific channel. This problem has existed for a long time.

It is widely known that the generalized strain rate is not decomposable to the individual rates of shear and extension. The present invention therefore proposes a method of obtaining the principal shear rate and principal extension rate from the generalized strain rate, containing four steps:

Step 1: Rotation Matrix

The rotation matrix R is a coordinate transfer matrix for the rate-of-deformation tensor from the global coordinate to the principal flow coordinate, as below:

$$R = \begin{bmatrix} t \\ n \\ b \end{bmatrix} \quad (27)$$

where t represents the unit tangent vector, n represents the unit normal vector, and b represents the unit bi-normal vector.

The flow velocity vector indicates the tangent direction/vector t of the flow line, while the direction of the velocity changes along the arc of the flow line dv/ds is the same as the unit normal vector n. The bi-normal vector b is determined by the tangent and normal vectors.

$$t = \frac{v}{|v|} \quad (28)$$

$$n = \frac{dv/ds}{|dv/ds|} \quad (29)$$

$$b = t \times n \quad (30)$$

Thus, the flow streamline system coordinates consist of the vectors t, n, and b, which are orthogonal, t⊥n, n⊥b, b⊥t. In addition, the rotation matrix is an orthogonal matrix:

$$RR^T = R^T R = I = \begin{bmatrix} 1 & 0 & 0 \\ 0 & 1 & 0 \\ 0 & 0 & 1 \end{bmatrix} \quad (31)$$

Step 2: Coordinate Transformation

The rate-of-deformation tensor D is transformed from the global coordinate to the principal flow coordinate:

$$D^* = RDR^T = \begin{bmatrix} d^*_{11} & d^*_{12} & d^*_{13} \\ d^*_{12} & d^*_{22} & d^*_{23} \\ d^*_{13} & d^*_{23} & d^*_{33} \end{bmatrix} \quad (32)$$

where D* represents the principal tensor of the tensor D.

Step 3: Decomposition

The principal tensor D* is decomposed to the principal shear matrix S* and the principal extension matrix E*

$$D^* = S^* + E^* \quad (33)$$

$$(34)$$

$$S^* = \begin{bmatrix} 0 & d^*_{12} & d^*_{13} \\ d^*_{12} & 0 & d^*_{23} \\ d^*_{13} & d^*_{23} & 0 \end{bmatrix}$$

$$E^* = \begin{bmatrix} d^*_{11} & 0 & 0 \\ 0 & d^*_{22} & 0 \\ 0 & 0 & d^*_{33} \end{bmatrix} \quad (35)$$

Step 4: Calculation

Eventually, one can determine the principal shear rate $\dot{\gamma}_S^*$, the principal extension rate $\dot{\gamma}_E^*$, and the total strain rate $\dot{\gamma}$:

$$\dot{\gamma}_S^* = \sqrt{2S^*:S^*} \quad (36)$$

$$\dot{\gamma}_E^* = \sqrt{2E^*:E^*} \quad (37)$$

$$\dot{\gamma}^2 = (\dot{\gamma}_S^*)^2 + (\dot{\gamma}_E^*)^2 \quad (38)$$

Two new quantities are used to show the degree of shear and extension variation with respect to flow geometric features. These are based on extensive research of complicated flow phenomena related to the details of extension effect, such as the contraction flow at gate and nozzle regions, and the fountain flow of the melt front in the cavity.

Figure 4A:
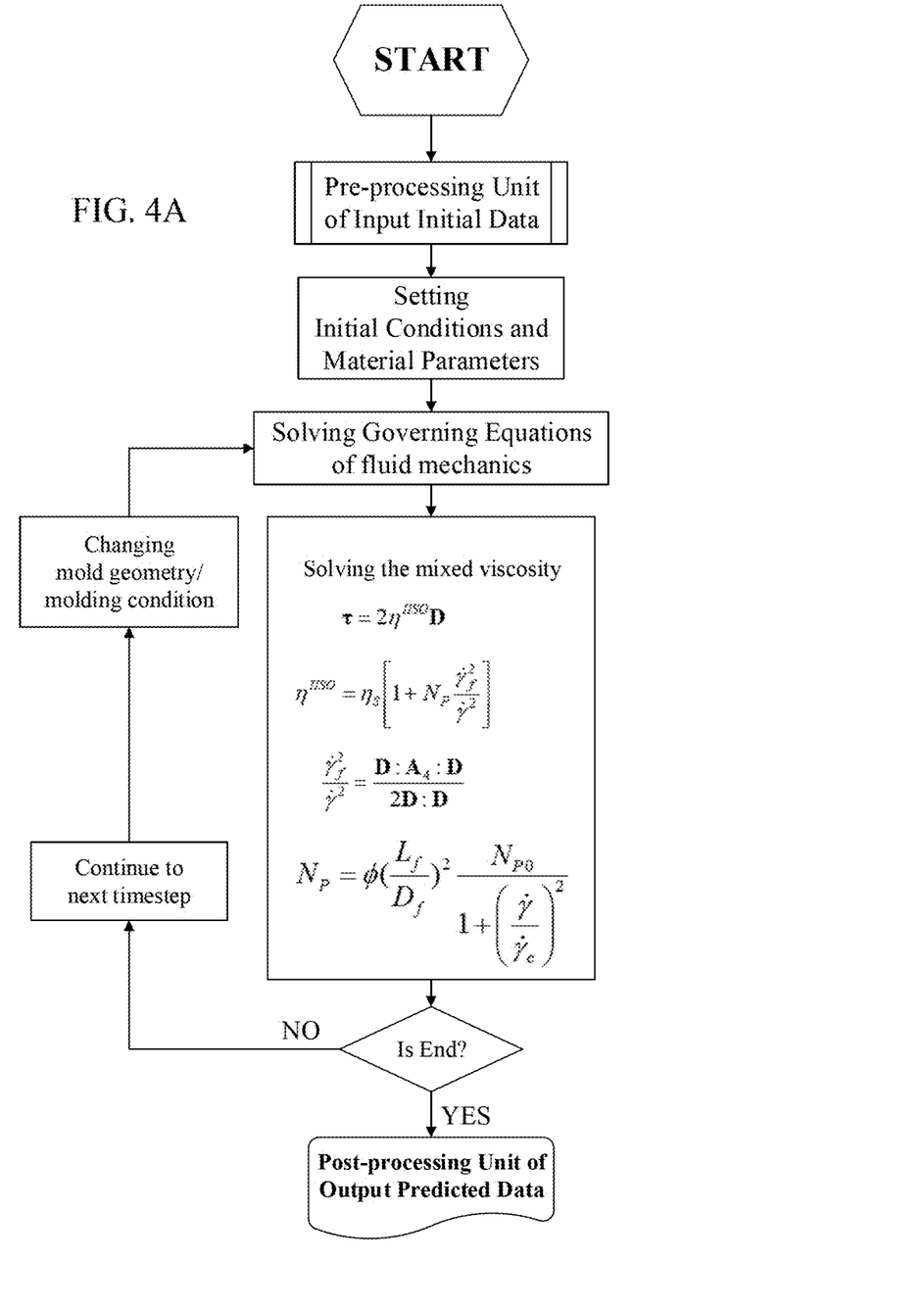
FIG. 4A is a flowchart showing an injection-molding simulation operation in accordance with some embodiments of the present disclosure.
Figure 4B:
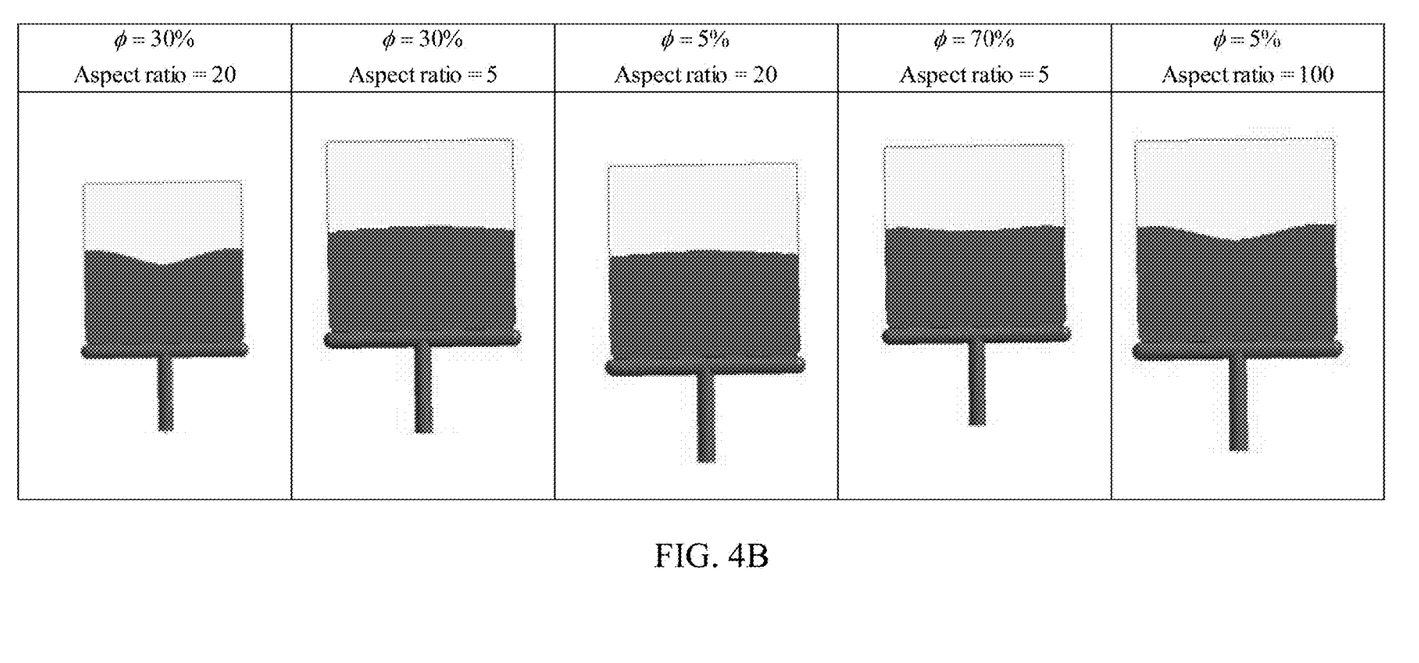
FIG. 4B shows simulation results of several molding material with different concentrations and aspect ratios of fibers in accordance with some embodiments of the present disclosure.

FIG. 4A is a flowchart showing an injection-molding simulation operation in accordance with some embodiments of the present disclosure, and FIG. 4B shows simulation results of several molding materials with different concentrations and aspect ratios of fibers in accordance with some embodiments of the present disclosure. Referring to FIG. 4A and FIG. 4B, in injection-molding simulation operations, the governing equations of fluid mechanics that describe the transient flow behaviors are as follows:

$$\frac{\partial \rho}{\partial t} + \nabla \cdot \rho u = 0 \quad (39)$$

$$\frac{\partial}{\partial t}(\rho u) + \nabla \cdot (\rho u u) = \nabla \cdot \sigma + \rho g \quad (40)$$

$$\sigma = -PI + \tau \quad (41)$$

$$\rho C_P \left( \frac{\partial T}{\partial t} + v \cdot \nabla T \right) = \nabla \cdot (k \nabla T) + \eta_S \dot{\gamma}^2 \quad (42)$$

where ρ represents density; u represents the velocity vector; t represents time; σ represents the total stress tensor; τ represents the extra stress tensor; ∇v represents the velocity gradient tensor; g represents the acceleration vector of gravity; P represents pressure; $C_P$ represents specific heat; T represents temperature; k represents thermal conductivity; $\eta_S$ represents shear viscosity; and $\dot{\gamma}$ represents the total strain rate.

Solving the governing equations (39)-(42) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives $$\left( \frac{\partial}{\partial t} \right)$$

in the governing equations (39)-(42) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 4 can be implemented using commercial injection-molding simulation software, Moldex3D (CoreTech System Co. of Taiwan), to facilitate the orientation predictions of the molding resin.

Referring to FIG. 4, in case the extension rate distribution and the shear rate distribution of the molding resin do not meet the product specification, the geometry of the mold cavity and/or the molding condition of the molding machine are changed, and the process is repeated until the extension rate distribution and the shear rate distribution of the molding resin meet the product specification.

Figure 5:
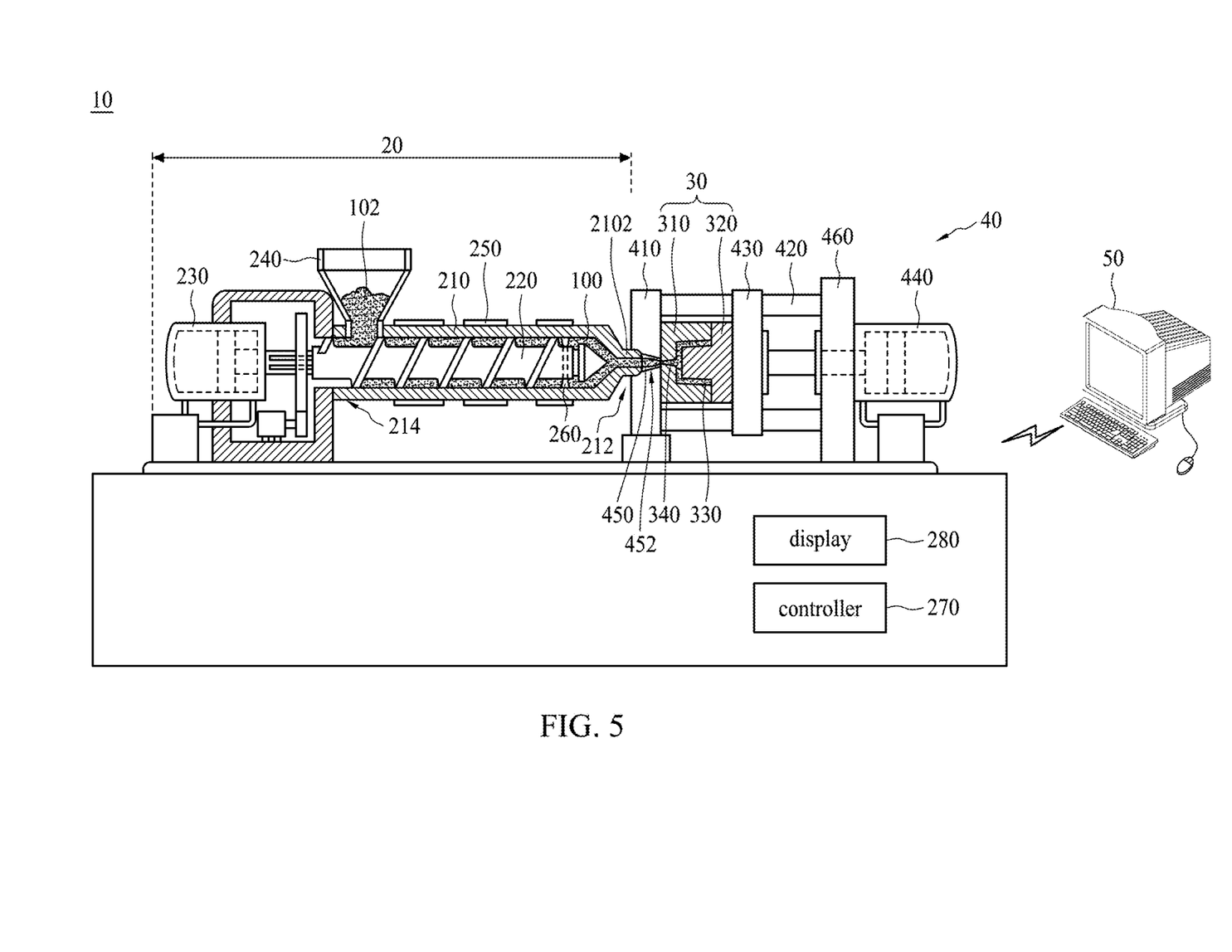
FIG. 5 is a schematic view of an injection-molding apparatus in accordance with some embodiments of the present disclosure.

FIG. 5 is a schematic view of an injection-molding apparatus in accordance with some embodiments of the present disclosure. Referring to FIG. 5, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bushing 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on one of the plurality of tie bars 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the phase of the plastic granules 102 is changed from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The injection-molding apparatus 10 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding machine 20 by the on-site technicians particularly where the on-site technicians' intervention is required.

In some embodiments, the injection-molding apparatus 10 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 6:
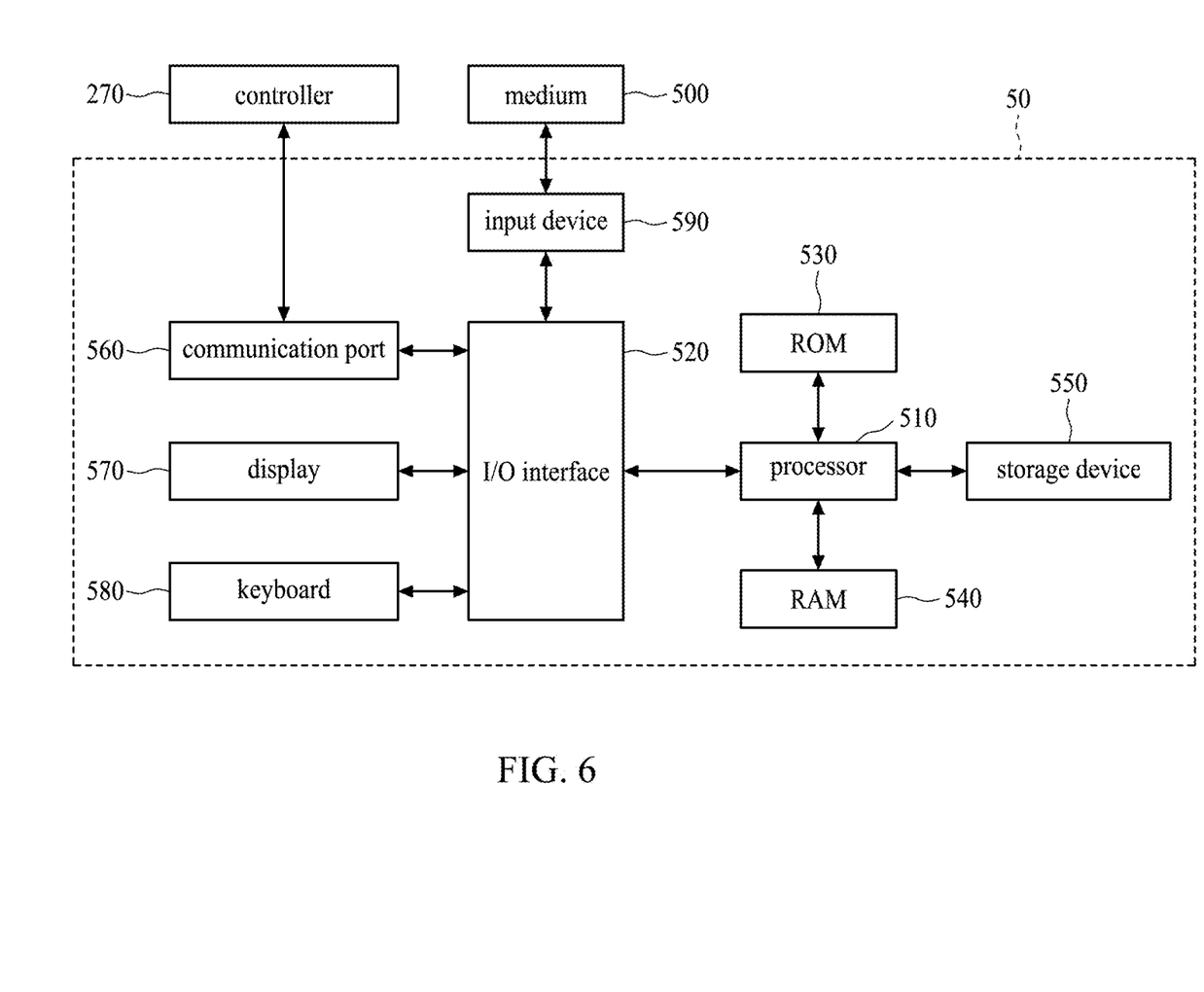
FIG. 6 is a functional block diagram of the computer in FIG. 5.

FIG. 6 is a functional block diagram of the computer 50 in FIG. 5. Referring to FIG. 6, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

The present disclosure provides a molding system for preparing an injection-molded plastic article. The molding system includes a molding machine; a mold disposed on the molding machine and having a mold cavity for being filled with a molding resin including a plurality of polymer chains;

a processing module configured to generate an anisotropic viscosity distribution of the molding resin in the mold cavity based on a molding condition for the molding machine; wherein the anisotropic viscosity distribution of the molding resin is generated based in part on consideration of an integral effect of a volume fraction and an aspect ratio of the plurality of fibers; and a controller coupled to the processing module and configured to control the molding machine with the molding condition using the generated anisotropic viscosity distribution of the molding resin to perform an actual molding process for preparing the injection-molded plastic article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an injection-molded plastic article, comprising:
   a molding machine;
   a mold disposed on the molding machine and having a mold cavity for being filled with a molding resin including a polymeric material having a plurality of fibers;
   a processing module configured to simulate an anisotropic viscosity distribution of the molding resin in the mold cavity based on a molding condition for the molding machine; wherein the anisotropic viscosity distribution of the molding resin is simulated based in part on consideration of an integral effect of a volume fraction and an aspect ratio of the plurality of fibers; and
   a controller coupled to the processing module and configured to control the molding machine with the molding condition using the simulated anisotropic viscosity distribution of the molding resin to perform an actual molding process for preparing the injection-molded plastic article;
   wherein the processing module performs a first model to simulate the integral effect of a volume fraction and an aspect ratio of the fibers, and the first model is represented by an expression:

$$N_P = \frac{\eta_E}{\eta_s} = \phi \left(\frac{L_f}{D_f}\right)^2 \frac{N_{P0}}{1 + \left(\frac{\dot{\gamma}}{\dot{\gamma}_c}\right)^2}$$

where $N_p$ is the ratio of elongation viscosity $\eta_E$ to shear viscosity $\eta_S$; $\phi$ is the volume fraction of the fibers, and $L_f$ and $D_f$ are fiber length and fiber diameter, respectively, $N_{P0}$ and $\dot{\gamma}_c$ are parameters.

2. The molding system of claim 1, wherein the processing module is further configured to simulate a mixed anisotropic viscosity distribution of the molding resin in the mold cavity based on a molding condition for the molding machine, wherein the mixed anisotropic viscosity distribution of the molding resin is simulated by taking into consideration an extension rate distribution and a shear rate distribution of the molding resin.

3. The molding system of claim 2, wherein the processing module performs a second model to simulate the mixed anisotropic viscosity distribution of the molding resin, and the second model is represented using an expression:

$$\eta_M = \eta_s \left[1 + (R_{TR})\frac{(\dot{\gamma}_E^*)^2}{(\dot{\gamma})^2}\right]$$

$$R_{TR}(\dot{\gamma}) = \frac{\eta_E}{\eta_s} = N_1 + \frac{N_2}{[1 + (\lambda\dot{\gamma})^{n_1}]^{n_2}}$$

$$\dot{\gamma}^2 = (\dot{\gamma}_S^*)^2 + (\dot{\gamma}_E^*)^2$$

where $\eta_M$ represents the mixed anisotropic viscosity distribution, $\eta_S$ represents a shear viscosity distribution, $\eta_E$ represents an extension viscosity distribution, $N_1$, $N_2$, $n_1$, $n_2$, and $\lambda$ are constants, $\dot{\gamma}$ represents a total strain rate distribution of the molding resin, $\dot{\gamma}_S^*$ represents the shear rate distribution of the molding resin, and $\dot{\gamma}_E^*$ represents the extension rate distribution of the molding resin.

4. The molding system of claim 2, wherein the processing module is configured to simulate the extension rate distribution and the shear rate distribution of the molding resin based in part on consideration of a velocity distribution of the molding resin in the mold cavity.

5. The molding system of claim 4, wherein the processing module is configured to simulate the extension rate distribution and the shear rate distribution of the molding resin in a principal flow streamline coordinate system, and simulate the velocity distribution of the molding resin in the mold cavity in a Cartesian coordinate system.

6. The molding system of claim 5, wherein the processing module is configured to simulate a rate-of-deformation distribution of the molding resin in the Cartesian coordinate system based in part on consideration of the velocity distribution due to a geometry variation of the mold cavity.

7. The molding system of claim 6, wherein the processing module is configured to transform the rate-of-deformation distribution of the molding resin in the Cartesian coordinate system into a rate-of-deformation distribution of the molding resin in the principal flow streamline coordinate system.

8. The molding system of claim 7, wherein the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module is configured to simulate the rate-of-deformation distribution of the molding resin in the principal flow streamline coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where R and $R^T$ represent coordinate transfer matrixes represented by an expression:

$$R = \begin{bmatrix} t \\ n \\ b \end{bmatrix}$$

$$RR^T = R^T R = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

9. The molding system of claim 8, wherein the unit tangent vector t, the unit normal vector n, and the unit bi-normal vector b are represented by an expression:

$$t = \frac{v}{|v|}$$

$$n = \frac{dv/ds}{|dv/ds|}$$

$$b = t \times n$$

where v is a flow velocity vector indicating the tangent direction of the flow line, and dv/ds is a direction of velocity changes along the arc of the flow line.

10. The molding system of claim 9, wherein the processing module is configured to divide the rate-of-deformation distribution of the molding resin in the principal flow streamline coordinate system into the extension rate distribution and the shear rate distribution of the molding resin represented by an expression:

$$D^* = S^* + E^*$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2S^* : S^*}$$

$$\dot{\gamma}_E^* = \sqrt{2E^* : E^*}$$

$$\dot{\gamma}^2 = (\dot{\gamma}_S^*)^2 + (\dot{\gamma}_E^*)^2$$

where $\dot{\gamma}$ represents a total strain rate distribution of the molding resin, $\dot{\gamma}_S^*$ represents the shear rate distribution, and $\dot{\gamma}_E^*$ represents the extension rate distribution.

11. The molding system of claim 6, wherein the processing module is configured to simulate the extension rate distribution and the shear rate distribution of the molding resin based in part on consideration of the rate-of-deformation distribution of the molding resin due to the geometry variation of the mold cavity.

* * * * *